United States Patent
LaBella et al.

(10) Patent No.: US 11,038,421 B2
(45) Date of Patent: Jun. 15, 2021

(54) METHODS AND APPARATUS FOR ADAPTIVE TIMING FOR ZERO VOLTAGE TRANSITION POWER CONVERTERS

(71) Applicant: TEXAS INSTRUMENTS INCORPORATED, Dallas, TX (US)

(72) Inventors: Thomas Matthew LaBella, Dallas, TX (US); Michael G. Amaro, Naperville, IL (US); Jeffrey Anthony Morroni, Parker, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/670,638

(22) Filed: Oct. 31, 2019

(65) Prior Publication Data

US 2020/0067410 A1    Feb. 27, 2020

Related U.S. Application Data

(63) Continuation of application No. 16/241,612, filed on Jan. 7, 2019, now Pat. No. 10,468,987, which is a
(Continued)

(51) Int. Cl.
*H02M 3/158* (2006.01)
*H02M 1/00* (2006.01)
*H02M 1/08* (2006.01)

(52) U.S. Cl.
CPC ............. *H02M 3/158* (2013.01); *H02M 1/08* (2013.01); *H02M 2001/0009* (2013.01);
(Continued)

(58) Field of Classification Search
CPC ...... H02M 3/158; H02M 3/156; H02M 3/155; H02M 1/08; H02M 1/083; H02M 1/088;
(Continued)

(56) References Cited

U.S. PATENT DOCUMENTS 5,594,635 A    1/1997  Gegner
5,684,688 A   11/1997  Rouaud et al.
(Continued)

FOREIGN PATENT DOCUMENTS

CN        1278120 A    12/2000
CN      201846233 U     5/2011
(Continued)

OTHER PUBLICATIONS

Asad Abidi et al., "Understanding the Regenerative Comparator Circuit" Electrical Engineering Department, University of California, Los Angeles, 2014 IEEE, 8 pgs.
(Continued)

*Primary Examiner* — Gustavo A Rosario-Benitez
(74) *Attorney, Agent, or Firm* — Michael A. Davis, Jr.; Charles A. Brill; Frank D. Cimino

(57) ABSTRACT

Timing circuitry causes: a first closed signal on a first switch control output before a signal on a second switch control output changes from a second closed signal to a first open signal; the first switch control output to provide a second open signal after a first selected time after the second switch control output changes from the second closed signal to the first open signal; and a third switch control output to provide a third closed signal a second selected time after the first switch control output changes from the first closed signal to a third open signal. A beginning of the first closed signal to a beginning of the first open signal is based on a later of: a current through a switch connected to the second switch control output exceeding a threshold current; and a clocked time after the beginning of the first closed signal.

20 Claims, 7 Drawing Sheets

Related U.S. Application Data continuation of application No. 15/350,697, filed on Nov. 14, 2016, now Pat. No. 10,177,658.

(60) Provisional application No. 62/322,512, filed on Apr. 14, 2016.

(52) U.S. Cl.
CPC ............ *H02M 2001/0032* (2013.01); *H02M 2001/0058* (2013.01); *Y02B 70/10* (2013.01)

(58) Field of Classification Search
CPC ............... H02M 1/38; H02M 3/1584; H02M 2001/009; H02M 2001/0058; H02M 2001/0022; H02M 2001/0025; H02M 2001/0038; H02M 2001/0054; H02M 2001/0067; H02M 2001/007
See application file for complete search history.

(56) References Cited

U.S. PATENT DOCUMENTS

| | | | |
|---|---|---|---|
| 5,736,842 A | 4/1998 | Jovanovic | |
| 5,793,190 A | 8/1998 | Sahlstrom et al. | |
| 6,462,963 B1 | 10/2002 | Wittenbreder | |
| 6,853,174 B1 | 2/2005 | Inn | |
| 7,145,316 B1 | 12/2006 | Galinski, III | |
| 7,940,033 B2 | 5/2011 | Dowlatabadi | |
| 8,259,421 B2 | 9/2012 | Nakahashi et al. | |
| 9,172,299 B2 | 10/2015 | Hamza et al. | |
| 9,350,240 B2 | 5/2016 | Dong et al. | |
| 9,673,706 B2 | 6/2017 | Matsuki | |
| 10,164,521 B2* | 12/2018 | Castelli | H02M 1/42 |
| 2004/0136209 A1 | 7/2004 | Hosokawa et al. | |
| 2008/0068867 A1 | 3/2008 | Yamada | |
| 2008/0278128 A1 | 11/2008 | Nagase | |
| 2009/0021962 A1* | 1/2009 | Miftakhutdinov | H02M 3/33592 363/17 |
| 2009/0027027 A1 | 1/2009 | Lin et al. | |
| 2009/0059626 A1* | 3/2009 | Kanakubo | H02M 3/1582 363/39 |
| 2009/0134855 A1 | 5/2009 | Landwehr | |
| 2009/0140706 A1 | 6/2009 | Taufik et al. | |
| 2009/0237042 A1 | 9/2009 | Glovinski | |
| 2010/0061122 A1 | 3/2010 | Okubo et al. | |
| 2010/0164593 A1 | 7/2010 | Ha et al. | |
| 2010/0327834 A1 | 12/2010 | Lowe, Jr. | |
| 2011/0043175 A1* | 2/2011 | Sohma | H02M 3/156 323/282 |
| 2011/0149610 A1 | 6/2011 | Moussaoui et al. | |
| 2011/0156685 A1 | 6/2011 | Chen et al. | |
| 2012/0099232 A1 | 4/2012 | Kuroyabu et al. | |
| 2012/0212276 A1* | 8/2012 | Ziegler | H02M 1/4225 327/303 |
| 2012/0218785 A1 | 8/2012 | Glovinski | |
| 2012/0274294 A1 | 11/2012 | Lee et al. | |
| 2013/0093403 A1 | 4/2013 | Jia et al. | |
| 2013/0235631 A1 | 9/2013 | Pahlevaninezhad et al. | |
| 2013/0249520 A1 | 9/2013 | Oikarinen et al. | |
| 2014/0104952 A1 | 4/2014 | Takeuchi et al. | |
| 2014/0152271 A1 | 6/2014 | Jeong et al. | |
| 2014/0176527 A1* | 6/2014 | Liu | G09G 3/3677 345/212 |
| 2014/0177300 A1 | 6/2014 | Lagorce et al. | |
| 2014/0232359 A1 | 8/2014 | Dash et al. | |
| 2014/0266130 A1 | 9/2014 | Chiang et al. | |
| 2015/0002115 A1 | 1/2015 | Shenoy et al. | |
| 2015/0022170 A1 | 1/2015 | Chen | |
| 2015/0162815 A1 | 6/2015 | Mikami et al. | |
| 2015/0214827 A1 | 7/2015 | Yoon et al. | |
| 2015/0326123 A1 | 11/2015 | Fukushima et al. | |
| 2016/0065071 A1 | 3/2016 | Matsuki et al. | |
| 2016/0233768 A1 | 8/2016 | de Cremoux et al. | |
| 2016/0365790 A1 | 12/2016 | Ye et al. | |
| 2017/0019093 A1 | 1/2017 | Kanda et al. | |
| 2017/0063227 A1 | 3/2017 | Nakamura | |
| 2017/0126120 A1 | 5/2017 | Chakraborty et al. | |
| 2017/0154739 A1 | 6/2017 | Sugahara et al. | |
| 2018/0254708 A1* | 9/2018 | Zhou | H02M 3/1584 |

FOREIGN PATENT DOCUMENTS

| | | |
|---|---|---|
| CN | 103023322 A | 4/2013 |
| CN | 104201884 | 10/2014 |
| CN | 204538968 U | 8/2015 |
| CN | 105322791 A | 2/2016 |
| CN | 205039692 U | 2/2016 |
| JP | H07123707 | 12/1994 |
| JP | 2008047572 A | 8/2008 |

OTHER PUBLICATIONS

Behzad Razavi, "The StrongARM Latch", A Circuit for All Seasons, IEEE Solid-State Circuits Magazine, Spring 2015, pp. 12-17.
http://escholarship.org/us/item/6st6k2nz, 2.5.4 Comparator Design, pp. 27-28, 2013.
Jing Xue, Ho Lee, "A 2MHz 12-to-100V 90%-Efficiency Self-Balancing ZVS Three-Level DC-DC Regulator with Constant-Frequency AOT V2 Control and 5ns ZVS Turn-On Delay", ISSCC 2016 / Session 12 / Efficient Power Conversion / 12.5, 2016 IEEE International Solid-State Circuits Conference, Digest of Technical Papers, pp. 226-228.
Guichao Hua, Ching-Shan Leu, Yimin Jiang and Fred C.Y. Lee, "Novel Zero-Voltage-Transition PWM Converters," IEEE Trans. Power Electron., Mar. 1994, vol. 9, No. 2, pp. 213-219; accessed Nov. 11, 2016, http://coral.ufsm.br/gepocufsm/arquivos/diversos/ELC1037/Fred_Lee_(ZVT_Classic).pdf.
International Search Report from corresponding PCT Application No. PCT/US2016/069149, dated May 25, 2017 (2 pages).
International Search Report from corresponding PCT Application No. PCT/US2017/027452, dated Aug. 24, 2017 (2 pages).
Office Action for Chinese Patent Application No. CN201780030346. 8, dated Mar. 19, 2020, 5 pages.
JP2008047572A, Machine Translation, 15 pages.
CN201846233U, Machine Translation, 14 pages.
CN205039692U, Machine Translation, 10 pages.
CN105322791A, Machine Translation, 13 pages.
CN103023322A, Machine Translation, 14 pages.
CN204538968U, Machine Translation, 9 pages.
CN1278120A, Machine Translation, 15 pages.
Office Action for Chinese Patent Application No. CN201710234583. 8, dated Mar. 20, 2020, 5 pages.

* cited by examiner

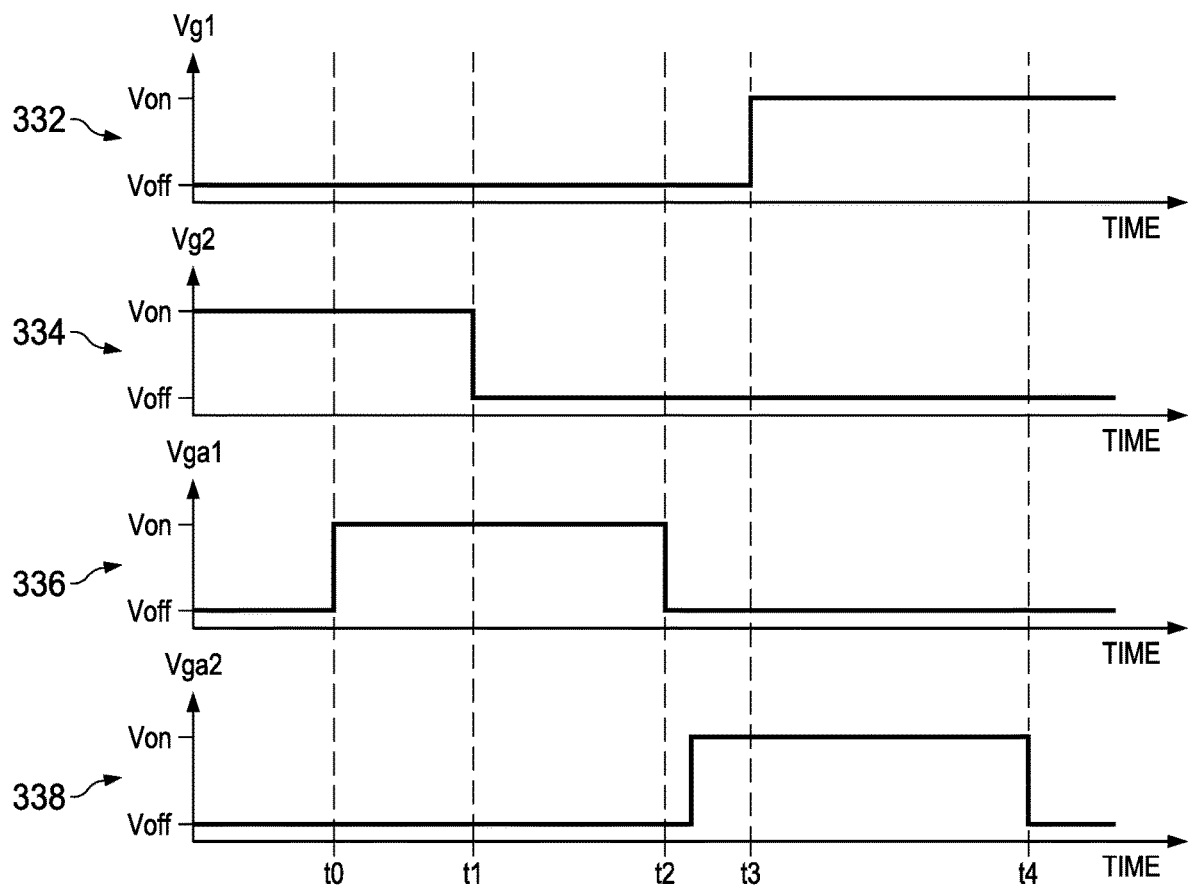
FIG. 3
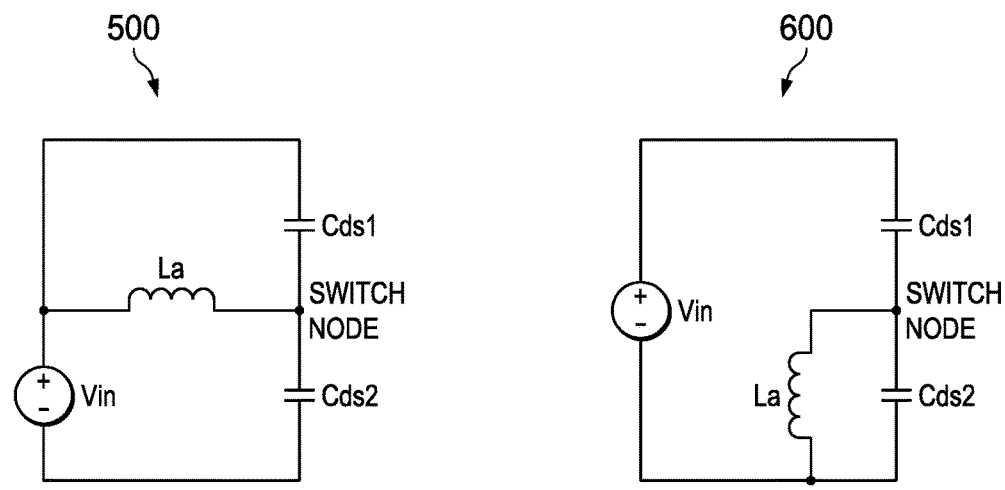
FIG. 5
FIG. 6

METHODS AND APPARATUS FOR ADAPTIVE TIMING FOR ZERO VOLTAGE TRANSITION POWER CONVERTERS

CROSS-REFERENCE TO RELATED APPLICATIONS

This application is a continuation of U.S. patent application Ser. No. 16/241,612 filed Jan. 7, 2019, which is a continuation of U.S. patent application Ser. No. 15/350,697 filed Nov. 14, 2016 (issued as U.S. Pat. No. 10,177,658), which claims priority to U.S. Provisional Patent Application Ser. No. 62/322,512 filed Apr. 14, 2016, the entireties of all of which are incorporated herein by reference. Also, this application is related to U.S. patent application Ser. No. 14/982,750 (issued as U.S. Pat. No. 9,654,003), the entirety of which is incorporated herein by reference.

BACKGROUND

This relates generally to electronics, and, in particular, to circuits for power conversion.

A category of power supplies known as switching power supplies date back several decades and are currently heavily utilized in the electronics industry. Switching power supplies are commonly found in many types of electronic equipment such as industrial machinery, automotive electronics, computers and servers, mobile consumer electronics (mobile phones, tablets, etc.), battery chargers for mobile electronics, and low cost/light weight items such as wireless headsets and key chain flashlights. Many applications include switching power supplies for portable, battery powered devices where an initial voltage is stepped down to a reduced voltage for supplying part of the device, such as integrated circuits that operate at fairly low voltage direct current (DC) levels. Switching supplies are popular because these power supplies can be lightweight and are low cost. Switching supplies are highly efficient in the conversion of the voltage and current levels of electric power when compared to the prior approaches using non-switching power supplies, such as linear power supplies.

High efficiency is achieved in switching power supplies by using high speed, low loss switches such as MOSFET transistors to transfer energy from the input power source (a battery, for example) to the electronic equipment being powered (the load) only when needed, so as to maintain the voltage and current levels required by the load.

Switching power supplies that perform conversion from a DC input (such as a battery) that supplies electric energy within a specific voltage and current range to a different DC voltage and current range are known as "DC-DC" converters. Many modern DC-DC converters are able to achieve efficiencies near or above 90% by employing zero voltage transition (ZVT). The ZVT technique was developed by Hua, et. al. and is described in a paper published in 1994 ("Novel Zero-Voltage-Transition PWM Converters," G. Hua, C.-S. Leu, Y. Jiang, and F. C. Lee, IEEE Trans. Power Electron., Vol. 9, No. 2, pp. 213-219, March 1994), which is incorporated by reference in its entirety herein. The use of the ZVT function in DC-DC converters reduces energy loss that would otherwise occur due to switching losses. ZVT also has the additional benefit of reducing voltage stress on primary power switches of the DC-DC converters. Reduction in voltage stress on a switch allows the switch to have a lower voltage tolerance rating and, therefore, potentially the switch can be smaller and less costly.

The ZVT circuitry employed by prior DC-DC converters introduces additional switches and corresponding additional energy loss and voltage stress on switching elements. However, the impact of energy loss and voltage stress of the ZVT function is much less significant than the overall performance improvements to the switching converters that employ ZVT functionality. Further improvements to reduce energy loss and voltage stress of the ZVT function are still needed. These improvements will permit improvement of electronic equipment in increased battery life, lower cost of operation, and improved thermal management.

SUMMARY

Timing circuitry is configured to cause: a first closed signal on a first switch control output before a signal on a second switch control output changes from a second closed signal to a first open signal; the first switch control output to provide a second open signal after a first selected time after the second switch control output changes from the second closed signal to the first open signal; and a third switch control output to provide a third closed signal a second selected time after the first switch control output changes from the first closed signal to a third open signal. A beginning of the first closed signal to a beginning of the first open signal is based on a later of: a current through a switch connected to the second switch control output exceeding a threshold current; and a clocked time after the beginning of the first closed signal.

BRIEF DESCRIPTION OF THE DRAWINGS

FIG. 3 is a timing diagram of the sequence of switch transition events to operate ZVT functionality for an example arrangement of the present application.

FIG. 5 is a circuit diagram of an ideal equivalent circuit diagram of the ZVT resonant circuit.

FIG. 6 is a circuit diagram of an ideal equivalent circuit diagram of the ZVT resonant circuit in an alternative arrangement.

DETAILED DESCRIPTION OF EXAMPLE EMBODIMENTS

Figure 1:
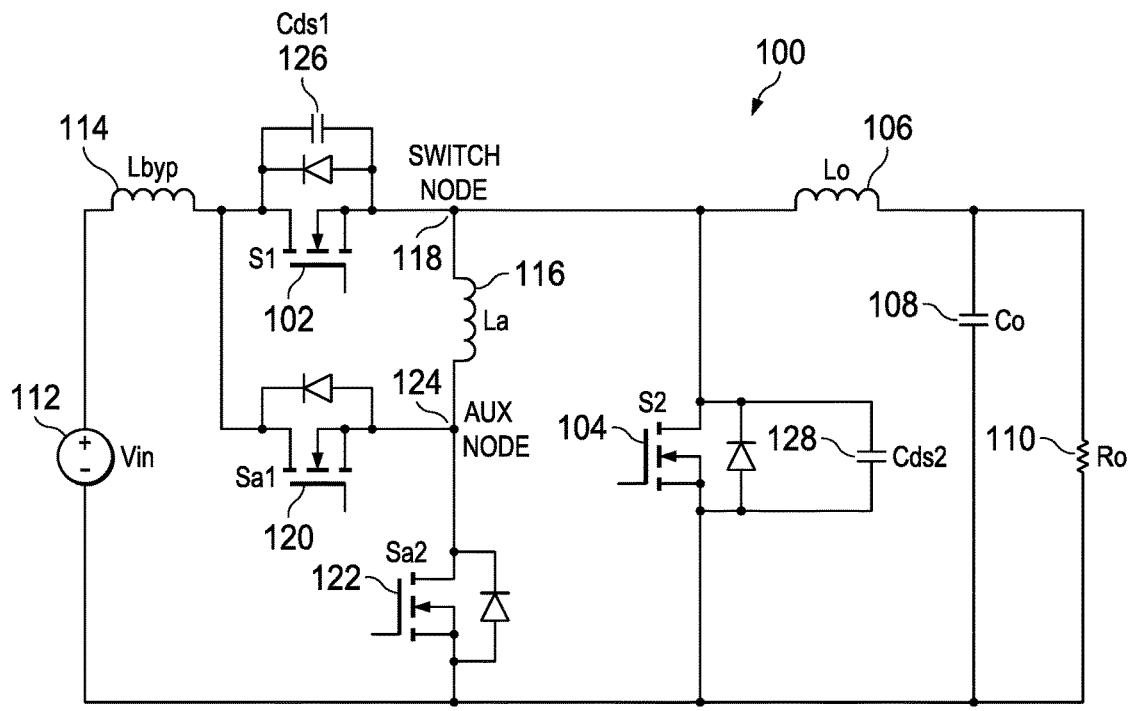
FIG. 1 is a circuit diagram illustrating a ZVT DC-DC buck power converter.

In the drawings, corresponding numerals and symbols generally refer to corresponding parts unless otherwise indicated. The drawings are not necessarily drawn to scale.

In this description, the term "coupled" may include connections made with intervening elements, and additional elements and various connections may exist between any elements that are "coupled."

To better illustrate the shortcomings of the prior ZVT approaches, circuit 100 of FIG. 1 illustrates a ZVT DC-DC converter arranged in a buck converter circuit topology. Buck DC-DC converters provide an output voltage at a lower voltage than an input voltage. Other types of DC-DC converters that can benefit from the use of ZVT switching include, but are not limited to, boost converters that increase voltage to the load to a voltage greater than the input voltage, and buck-boost DC-DC converters that dynamically transition between the buck and boost functions to adapt to various input voltage levels (having input voltages that could be either greater or less than the output voltage) to provide an output voltage to the load.

FIG. 1 illustrates in a simplified circuit diagram the switching elements, key passive components, and key parasitic elements of a ZVT DC-DC buck converter circuit 100. Omitted from FIG. 1 for simplicity of explanation are minor components, minor parasitic elements, the circuits for monitoring output voltage, and the control circuit for controlling the switch timing that are utilized in example ZVT DC-DC buck power converters.

In FIG. 1 circuit 100 includes two primary power switches, 102 (S1) and 104 (S2), that in conjunction with the output inductor 106 (Lo) and capacitor 108 (Co) perform the primary function of the buck converter. The buck converter circuit 100 supplies energy to the load (represented as a resistor 110 (Ro)) at an output voltage level Vo that is a reduced voltage from the DC input voltage supply 112 (Vin). Vin represents both the external element that is the source of input voltage (such as a battery or another power supply) to the ZVT power converter and the voltage level across the positive and negative terminals of the Vin input voltage source.

Auxiliary switches Sa1 and Sa2 and auxiliary inductor La are the components that are added to the conventional switching converter topology to accomplish the ZVT functionality. A primary parasitic inductance that contributes to voltage stress on switch S2 is represented in FIG. 1 by parasitic inductance 114 (Lbyp). The source terminal of transistor 102, the drain terminal of transistor 104 and one terminal of each auxiliary inductor 116 (La) and the output inductor 106 (Lo) are coupled as illustrated in FIG. 1 to a common switch node 118 (Switch Node). The first auxiliary switch 120 (Sa1), the second auxiliary switch 122 (Sa2), and the auxiliary inductor 116 are coupled together at auxiliary node 124 (Aux Node). All four switches in example circuit 100 of FIG. 1 (S1, S2, Sa1, and Sa2) are shown implemented as enhancement mode n-channel MOSFETs. Drain-to-source parasitic capacitances of switches S1 and S2 are important to the circuit description and are illustrated in FIG. 1 as capacitance 126 (Cds1) and capacitance 128 (Cds2), respectively. The intrinsic body diode of MOSFET switches is also shown connected between source and drain for all switches (S1, S2, Sa1, and Sa2) of FIG. 1.

While enhancement mode n-channel MOSFETs are commonly used as switches in DC-DC converters as shown in the example in FIG. 1, other types of transistor switches as well as diode switches have been employed and can be used to form the circuit 100. The switches in FIG. 1 can also be used to form other types of switching power converters.

Circuit 100 supplies a reduced voltage to the load (the output voltage is across resistor 110 (Ro)) by alternatively switching between two primary states. In one of the primary states (defined by switch S1 closed and switch S2 open, which means switch S1 is a transistor that is turned on, while switch S2 is a transistor that is turned off), the input voltage source (Vin) supplies energy to the load, and energy to maintain or increase magnetic energy is also stored in inductor Lo. In the other primary state (defined by switch S1 open and switch S2 closed, which means that switch S1 is a transistor that is turned off, while switch S2 is a transistor that is turned on), current flow from the input voltage (Vin) is blocked. In this state, the magnetic energy previously stored in inductor Lo is converted to electric energy, and supplies energy to the load (resistor Ro). The output voltage across the load Ro is maintained in a pre-defined range by varying the relative amount of time the circuit spends in each of the primary states.

Converters that alternate between the two states described hereinabove are sometimes described as pulse width modulated (PWM) switching converters. This description is used because the output voltage Vo is proportional to the input voltage Vin, multiplied by the duty cycle of switch S1 (a ratio of the on time of switch S1 to the total cycle period). Typically, prior known buck converters cycle between these states (often at frequencies such as hundreds of kHz to 1 MHz and above). In addition to the two primary states, there are brief dead times during the transitions between the two primary states. During the dead times, switches S1 and S2 are simultaneously open, that is the transistors implementing switches S1 and S2 are simultaneously turned off. Dead times are used to insure there is not a high current path across the input voltage source (Vin) directly to ground, which could occur if both switches S1 and S2 are simultaneously closed. Conventional PWM switching power supplies employ two dead times during each cycle of operation: a first dead time occurs when switch S1 opens and ends when switch S2 closes; and a second dead time occurs when switch S2 opens and ends when switch S1 closes.

In a ZVT converter, such as circuit 100, the ZVT function begins before the beginning of the second dead time with S2 opening, and the ZVT function ends after the second dead time ends with switch S1 closing. The ZVT function does not operate in the first dead time of the buck converter cycle described above (the time between switch S1 opening and S2 closing).

Figure 2:
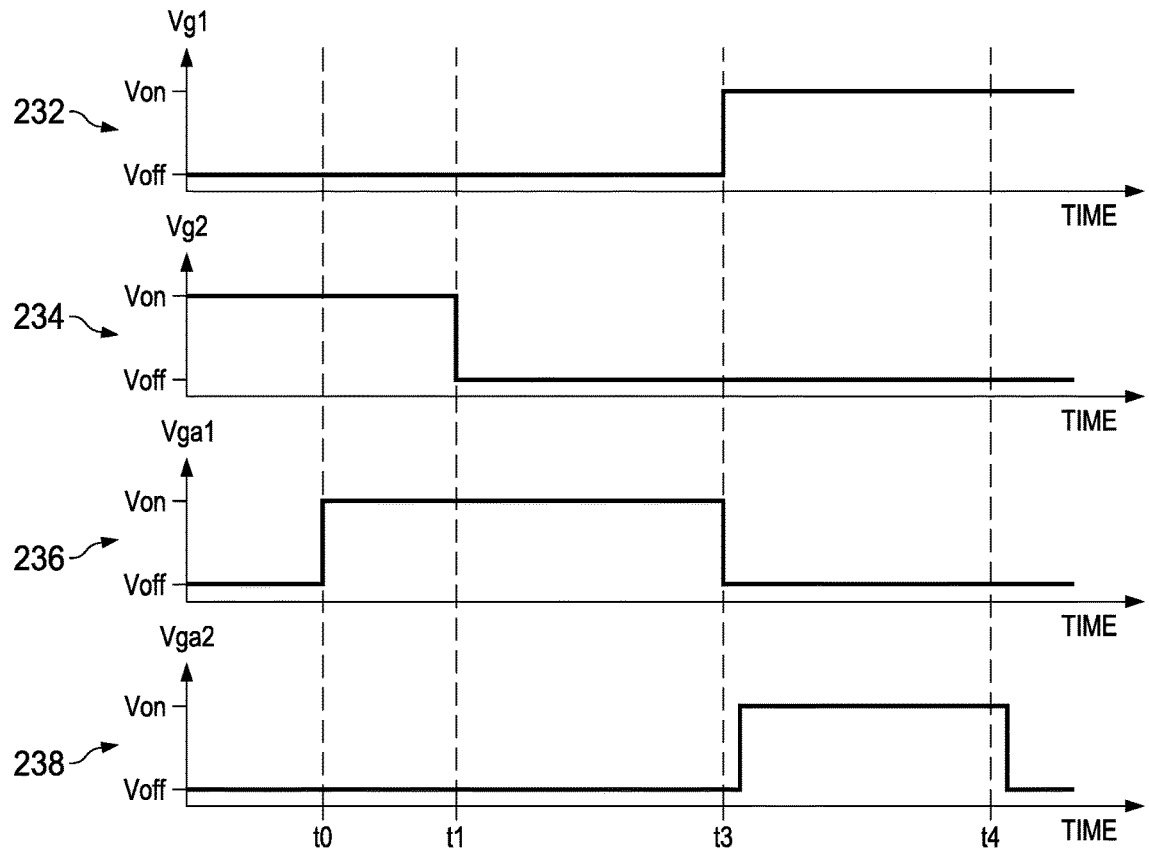
FIG. 2 is a timing diagram for a sequence of switch transition events to operate ZVT functionality.

FIG. 2 illustrates in a timing diagram the sequence of switch transition events used to operate ZVT functionality in the buck converter circuit 100. In FIG. 2, the switching events are labeled t0, t1, t3, and t4. (Note that there is no event labeled t2 in FIG. 2, for increasing simplicity of explanation when comparing the switching event sequence of the conventional ZVT DC-DC buck converters with the switching event sequences of example arrangements of the present application.) In FIG. 2, the dead time described hereinabove during the time interval between switch S2 opening and switch S1 closing begins at event t1 and ends at event t3.

The open and closed states of each of the four switches (primary S1, S2, and auxiliary switches Sa1, and Sa2) illustrated in FIG. 1 are represented in FIG. 2 by the voltage applied to the switch gates (Vg1, Vg2, Vga1, and Vga2 respectively) and shown in four graphs: 232; 234; 236; and 238. Graph 232 illustrates the voltage on the gate of switch S1, graph 234 illustrates the voltage on the gate of switch S2, graph 236 illustrates the voltage on the gate of switch Sa1, and graph 238 illustrates the voltage on the gate of switch Sa2. A voltage annotated as Von applied to a switch gate indicates the switch is closed (the corresponding transistor is on), and a voltage annotated as Voff indicates the switch is open (the corresponding transistor is off). FIG. 2 illustrates a sequence of switching events, and does not illustrate specific voltage levels, waveform shapes, and time increments.

ZVT functionality for prior known approaches begins at event labeled t0 in FIG. 2 with switch Sa1 turning on, as shown in graph 236. In the time leading up to event t0 switch S2 has been closed, and switches S1 and Sa2 have been open for a significant portion of the current buck converter cycle. Time progresses from event t0 to event t1 illustrated in FIG. 2. At time t1, switch S2 opens as shown in graph 234. At the next event, t3, switches S1 and Sa2 close as shown in both graphs 232, 238. Switch Sa1 opens at time t3, as shown in graph 236, and after a short delay to provide a dead time, Sa2 closes just after event t3, as shown in graph 238. At event t4, Sa2 opens as shown in graph 238 to complete ZVT functionality for the current cycle of the buck converter.

The example conventional ZVT buck converter circuit 100 illustrated in FIG. 1 accomplishes ZVT when the primary power switch S1 transitions from open to closed (S1 turn on as shown in graph 232) at event labeled t3 illustrated in FIG. 2. Switch S1 turns on at t3 with zero or near zero volts across it. For the circuit 100 to reach a condition with zero or near zero volts across switch S1 before S1 turning on (or closing), an L-C resonant circuit is used. The L-C resonant circuit increases the voltage at the source terminal of switch S1 (coupled to the node "Switch Node" in FIG. 1) until the voltage is approximately equivalent to the voltage at the drain terminal of S1, which is coupled to and approximately equivalent to the input voltage, Vin. The L-C resonant circuit includes the auxiliary inductor La and the parallel combination of capacitances Cds1 and Cds2 (the drain to source parasitic capacitances of the switches S1 and S2 respectively) (see FIG. 1). This L-C resonant circuit is referenced herein as the "ZVT resonant circuit." The ZVT resonant circuit is a portion of circuit 100. In some approaches, the ZVT resonant circuit resonates only when switch Sa1 is closed and switches S1, S2, and Sa2 are open, which is during the time span between events t1 and t3 in FIG. 2. The time span between events t1 and t3 for some approaches is equivalent to one-quarter cycle of the resonant frequency of the ZVT resonant circuit.

While some conventional DC-DC converters incorporating the ZVT function typically have lower energy loss and lower voltage stress on transistor switches when compared to DC-DC converters formed without the ZVT function, the ZVT function itself introduces additional energy loss and voltage stress.

There are two key contributors to energy loss of prior known ZVT functions that are reduced by use of the arrangements of the present application. First, energy is lost when auxiliary switch Sa1 turns off when conducting peak current as it transitions through the MOSFET linear region. The second key contribution to energy loss during the ZVT operation is the sum of conduction losses through the auxiliary switches Sa1, Sa2, the primary switch S1, and inductor La.

The most significant impact of voltage stress resulting from the ZVT function is on the voltage tolerance required for switch S2. Voltage stress on switch S2 impacts S2 transistor size and potential cost. The voltage stress on switch S2 is the result of switch Sa1 turning off with peak current flowing through it, causing a voltage spike across switch S2 induced by the parasitic inductance 114 (Lbyp). In addition, there is a voltage spike across Sa1 when it turns off with current flowing through it, due to ringing with parasitic inductances. However, sizing Sa1 for higher voltage tolerance is not a significant impact to potential converter cost, since Sa1 is already a relatively small transistor when compared to the primary power transistors, S1 and S2.

As discussed above, FIG. 1 illustrates in a simplified circuit diagram the switching elements, key passive components, and key parasitic elements of a ZVT DC-DC buck power converter. For the purposes of simplification, minor components, minor parasitic elements, and the circuits for monitoring output voltage and controlling the switch timing that are present in prior approaches and example arrangements of the present application are omitted from FIG. 1. An aspect of the arrangements of the present application is the sequencing and timing of transitions for the switches depicted in circuit 100. Consequently, circuit 100 is used herein for explanation of the switching events of a ZVT DC-DC buck power converter as well as for the illustration of arrangements of the present application.

In arrangements of the present application, the switch transition sequencing and timing employed results in improved power efficiency. Use of the arrangements also enables improved ZVT power converters with reduced semiconductor die area for switch implementation.

The switch transition sequencing and timing employed in the arrangements of the present application occurs during the operation of the ZVT function, and does not significantly impact the operation of circuit 100 during the remainder of the power supply cycle. Consequently, a description of the full power supply cycle is not included.

FIG. 3 illustrates in a timing diagram the sequence of switch transition events to operate ZVT functionality for an example arrangement of the '750 application. In FIG. 3, the switching events are labeled t0, t1, t2, t3, and t4.

The open and closed states of each of the four switches (S1, S2, Sa1, and Sa2) illustrated in FIG. 1 are represented in FIG. 3 by the voltage applied to the switch gates (Vg1, Vg2, Vga1, and Vga2 respectively). Graph 332 illustrates the voltage Vg1 at the gate terminal of switch S1. Graph 334 illustrates the voltage Vg2 at the gate terminal of switch S2. Graph 336 illustrates the voltage at the gate terminal of the switch Sa1. Graph 338 illustrates the voltage at the gate terminal of switch Sa2. A voltage annotated as Von applied to a switch gate indicates that the switch is closed because a transistor is on, and a voltage annotated as Voff indicates the switch is open because a transistor is off. Graphs 332, 334, 336 and 338 in FIG. 3 illustrate the sequence of switching events. FIG. 3 does not illustrate specific voltage levels, waveform shapes, and time increments. For both the arrangements of the present application and for other ZVT approaches there is a brief dead time between switch Sa1 turn off and switch Sa2 turn on. This dead time is used to insure there is not a high current path across the input voltage source, Vin. The dead time between switch Sa1 turn off and switch Sa2 turn on does not significantly impact circuit 100 functionality. Consequently, switch Sa1 turn off, the intervening dead time, and switch Sa2 turn on are illustrated as occurring in a single event (at time t2) in FIG. 3 for further simplicity of explanation.

ZVT functionality for the example arrangements of the '750 application begins with the event labeled t0 in FIG. 3, with switch Sa1 turning on, as shown in graph 336, while switch S2 remains closed (on) and switches S1 and Sa2 remain open. In FIG. 3, time progresses to event t1. At event t1, switch S2 opens as shown in graph 334. At the next event, t2, as shown in FIG. 3, switch Sa1 opens as illustrated in graph 336, and after a short delay that fulfills the dead time requirement, switch Sa2 closes as shown in graph 338. (In sharp contrast to the arrangements of the present application, in prior approaches, the ZVT circuits do not employ a switching event at time t2, as previously stated.) As shown in FIG. 3, at event t3 for the arrangements of the present application, switch S1 is closing as is illustrated in graph 332. At event t4, switch Sa2 opens as shown in graph 338 to complete ZVT functionality for the current cycle of the buck converter.

Additionally, the waveform and timing diagrams provided herein are not annotated with voltage and current values and time increments since specific values depend on a how a specific example arrangement is implemented. When waveforms are compared herein, the same relative voltage, current, and time scales are used.

For each successive span of time between the above stated switching events, a description of the ZVT functionality and the switch transition sequencing and timing employed by the arrangements of the present application within the respective time span follows, as well as a comparison of the present arrangement to prior approaches. In addition, a description of the circuit functionality to control the switch sequencing and timing of the arrangements of the present application is provided hereinbelow.

The first time span during the operation of the ZVT function is between events t0 and t1 as shown in FIG. 3. The ZVT function starts during each buck converter cycle at event t0. In the time leading up to t0, the ZVT function begins in a state with switch S1 open and switch S2 closed, and switches Sa1 and Sa2 are open. At event t0, switch Sa1 closes, allowing current to flow through the auxiliary inductor La, which ramps from zero amperes until the current flowing in inductor La is approximately equivalent to the current flowing through inductor Lo. Simultaneously, the current flowing in the closed switch S2 ramps to zero or near zero. The behavior of circuit 100 for both the arrangements of the present application and for the other ZVT approaches is similar for the time interval starting at event t0 and ending at event t1, except that the time at which event t1 occurs after event t0 is adjusted by the control circuit of the arrangements of the present application. The adjustments are further described hereinbelow.

The adjustment to the time at which event t1 occurs can be performed in order to modify the resonant trajectory of the ZVT resonant circuit, such that the switch node voltage will be equal or nearly equal to the input voltage, Vin, at event t3 (ZVT functionality for subsequent events is described below). Adjusting the resonant trajectory on an on-going basis allows the ZVT function to adapt to dynamic changes in the load and for other operating conditions. The adjustment to the time at which t1 (following the events at t0) occurs is accomplished in the arrangements indirectly by monitoring and adjusting the current Is2 flowing through switch S2 when it is turned off at event t1. To accomplish the adjustment of the S2 turn off current, the switch node voltage is measured at event t3. If the switch node voltage is equal to or greater than Vin at time t3, the target value (the current through S2 when S2 turned off, or IS2-off) for the S2 turn off current is incrementally reduced. If the switch node voltage is less than Vin at time t3, Is2-off is incrementally increased. During the operation of the ZVT function of the immediately following buck converter cycle, the current in switch S2 is monitored between events t0 and t1 and is compared to Is2-off (set in the previous cycle). In the arrangements, the switch S2 is turned off when the current Is2 is equal to or less than Is2-off.

The second time span during the operation of the ZVT function as shown in FIG. 3 is between events t1 and t2. For both the arrangements of the present application and for other ZVT approaches, switch S2 opens at event t1 with zero or near zero current flowing through it, as shown in graph 334. Switches S1 and Sa2 remain open at t1. With only switch Sa1 closed, the inductor La resonates with the parallel combination of the parasitic drain to source capacitances, Cds1 and Cds2, of switches S1 and S2, respectively (the ZVT resonant circuit). In example arrangements of the present application, event t2 occurs at a time that is ⅙ tr after event t1 (where "tr" is the resonant period of the ZVT resonant circuit). At ⅙ tr, the switch node reaches a voltage greater than ½ Vin. At time t2, Sa1 is opened and Sa2 is closed (after a short dead time delay between opening Sa1 and closing Sa2) as shown in FIG. 3 in graphs 336, 338.

Figure 4:
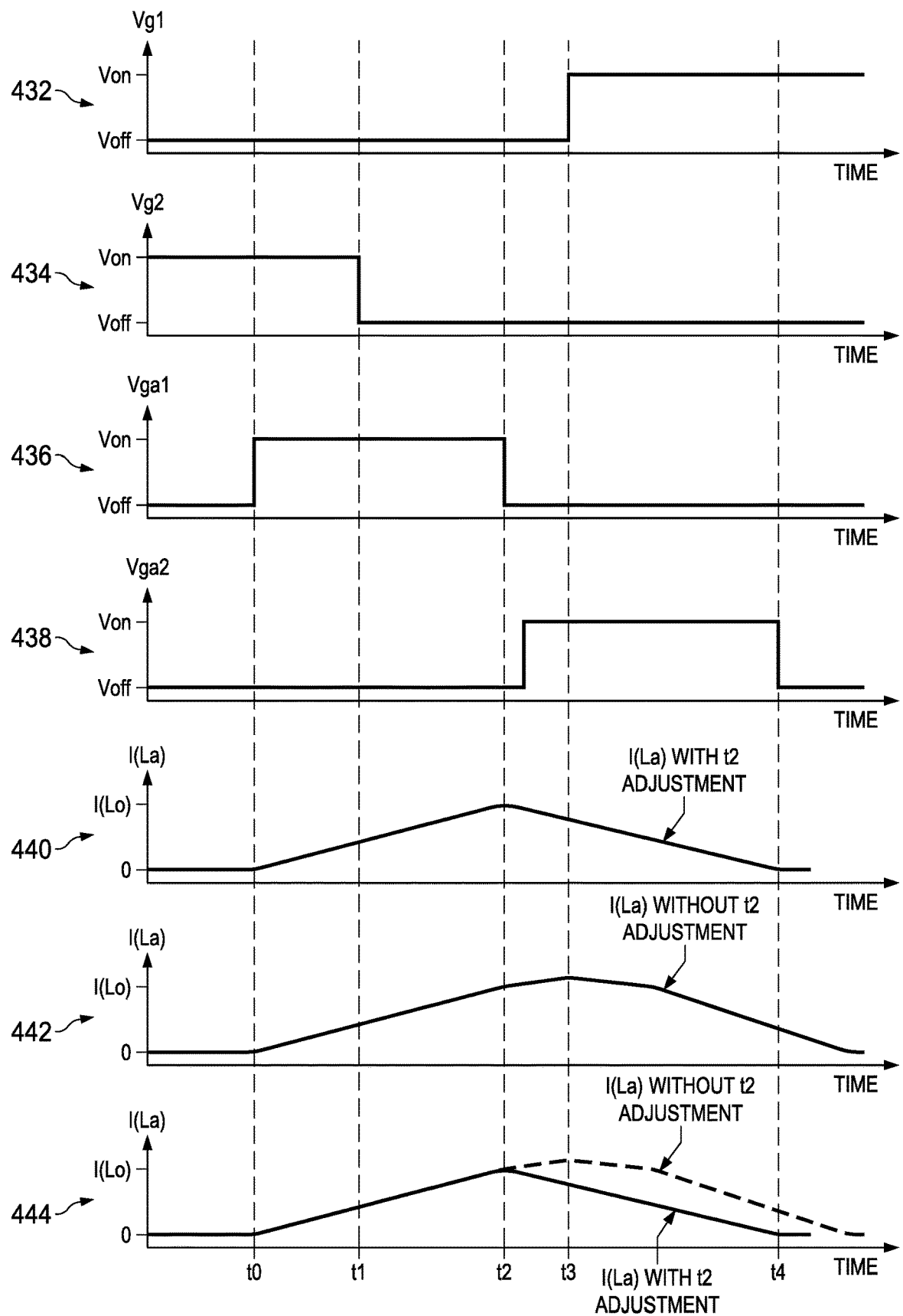
FIG. 4 is a group of waveform plots with the timing diagrams of FIG. 3.

FIG. 4 illustrates in graphs 440, 442 and 444 the current in auxiliary inductor 116 (La, FIG. 1), labeled I(La), for the example arrangements of the '750 application and also presents graphs comparing the current obtained to the corresponding current obtained in other approaches for conventional ZVT converters. The switching events t0, t1, t2, t3, and t4 shown in FIG. 4 are duplicated from FIG. 3 in graphs 432, 434, 436 and 438, respectively, for clarity of illustration. The time scales of FIG. 4 for I(La) waveforms are the same for both the arrangements of the present application and the prior approaches illustrated for comparison.

Graphs 432, 434, 436, and 438 of FIG. 4 correspond to the graphs 332, 334, 336 and 338 in FIG. 3, respectively, and depict the gate voltages on the switches S1, S2, Sa1, and Sa2, respectively, for circuit 100 in FIG. 1. In FIG. 4 an example sequencing arrangement of the '750 application is illustrated at the events t0, t1, t2, t3 and t4.

In FIG. 4, the current flowing in the inductor La (labeled 116 in FIG. 1) is shown on separate graphs 440 for I(La) with the event time t2 adjustment and 442 for I(La) without t2 adjustment, as well as graph 444 which combines both the arrangements on the same set of axes. Graph 444 is presented to illustrate that arrangements with t2 adjustment operate at lower inductor La current for a shorter time period during the time span between events t2 and t4. For the overlaid waveform diagram in graph 444, a dashed line is used to illustrate current I(La) without t2 adjustment to show where the waveforms differ significantly. In graphs 440, 442 and 444 of FIG. 4, the current through Lo is represented by fixed grid line labeled I(Lo). In practice, I(Lo) is not a fixed value and is load dependent. For simplicity of explanation, I(Lo) is shown as a fixed value.

An additional difference between approaches that do or do not adjust t2 is that in the arrangements where t2 is adjusted, a voltage spike occurs when switch Sa1 opens at event t2 with current flowing through it, due to ringing with parasitic inductances. In other ZVT buck converters where t2 and t3 coincide, this voltage spike appears only across switch S2, since it is open and switch S1 is closed when the spike occurs. In contrast, in the arrangements where t2 is adjusted, the arrangements operate by opening switch Sa1 with both S1 and S2 open and before the drain to source capacitance of S1 (Cds1) is fully discharged, distributing the voltage spike across both switches S1 and S2 in series. Specifically, in the approach where t2 is adjusted, the series combination of the parasitic drain-source capacitances Cds1 and Cds1 of switches S1 and S2 respectively form a capacitive divider across which the voltage spike occurs. Dividing the voltage spike across both S1 and S2 reduces the voltage tolerance requirement of switch S2 (when compared to the voltage tolerance requirement for the same switch in other approaches). The voltage tolerance requirement of the switch S1 is not increased with t2 adjustment, because the spike across S1 that occurs when Sa1 opens in the example arrangements is less than the voltage across S1 at other times during the operation of the buck converter.

The third time span during the operation of the ZVT function for the approach with t2 adjustment is between events t2 and t3. As stated hereinabove in the description of FIG. 3, event t2 for the arrangements of the '750 application occurs when the transition of switch Sa1 from closed to open occurs, and switch Sa2 transitions from open to closed shortly afterwards, with switches S1 and S2 remaining open. When switch Sa1 opens and switch Sa2 closes, the ZVT resonant circuit configuration is changed and the voltage across inductor La reverses. Current flow through inductor La will continue in the same direction, and resonance will continue on a different trajectory with the current in La resonating towards zero, resulting in the switch node continuing to charge. The energy stored in La at event t2 continues charging the switch node until it becomes approximately equivalent to the input voltage Vin, provided the event at time t2 occurs with the switch node voltage still sufficiently above ½ the Vin voltage level. It should be noted that for an ideal circuit, if t2 were to occur when the switch node is exactly ½ Vin, then the energy stored in inductor La will charge the switch node voltage to Vin. However, in the example arrangements, t2 should occur with the switch node at a voltage greater than ½ Vin so as to accommodate component parameter variance and non-ideal circuit characteristics. The switch node voltage becomes approximately equivalent to Vin at a time that is $\frac{1}{12}$ tr after the event t2, at which time event t3 occurs, with S1 closing. This sequence is shown in graphs 432, 434, 436, and 438 at time t3.

FIG. 5 illustrates in a simplified circuit diagram an equivalent ideal ZVT resonant circuit 500 for the example configuration operating during the span of time from event t1 to t2 described hereinabove. FIG. 6 illustrates in another simplified circuit diagram the equivalent ideal ZVT resonant circuit 600 for the example configuration for the span of time from event t2 to t3 described hereinabove. Both equivalent circuits 500 and 600 illustrate a portion of circuit 100 of FIG. 1 with switches S1, S2, Sa1, and Sa2 in the states described hereinabove for the respective time spans. For simplicity, in the diagrams for circuits 500 and 600, the switches Sa1 and Sa2 are treated as ideal and shown as interconnect conductors when closed, and are simply not shown when open.

As described hereinabove, during the time period between events t2 and t3 for arrangements of the present application, stored energy in inductor La is used to charge the switch node from a level greater than ½ Vin to Vin. In sharp contrast to the present arrangements, for ZVT converters using other approaches, the converters utilize energy from the power converter input voltage source, Vin, to charge the switch node to be approximately equivalent to the input voltage, Vin. Consequently, more energy is stored in La and current is higher in La when switch S1 closes at t3 during operation of prior approaches (than for the arrangements of the present application). Greater stored energy in La and higher current through La result in greater energy losses for the other approaches.

As stated hereinabove, the event t2 of the present arrangements is not part of the operation of other approach converters. Therefore, other approach ZVT resonant circuits continue resonance on the same trajectory for the full time span from t1 to t3. In contrast, for the example arrangements herein described, the resonant trajectory is modified at event t2 as described hereinabove.

As illustrated in FIG. 4, compared to other approaches, current through switch Sa1 is lower when Sa1 turns off during operation of example arrangements of the '750 application. The current through Sa1 is lower due to ramping the switch node voltage to a level greater than ½ Vin. The turn-off of switch Sa1 is performed early (when compared to the other approaches), as opposed to waiting for the switch node voltage to be approximately equivalent to Vin. As a result, energy lost by switch Sa1 while it is conducting in the transistor linear region (during the transition from on to off) is much lower for arrangements of the present application.

The fourth and final time span during the operation of the ZVT function is between events t3 and t4. During the period of time between events t3 and t4, switch S1 turns on at event t3, and the current in inductor La ramps down to zero, at which time Sa2 is turned off at event t4, ending the operation of the ZVT function for the current buck converter cycle. After switch S1 closes, the portion of the current in stored in inductor La that exceeds the current in Lo is returned to the source and the remainder of the current in La flows into Lo to supply the load.

There are at least three differences between the operations of other approaches and the operation of the arrangements of the '750 application in the time period between events t3 and t4. The first difference is that switch Sa1 opens and switch Sa2 closes at t3 in other approaches. For the approaches of the '750 application, Sa1 opens and Sa2 closes before the event t3 (at t2) as described hereinabove. The second difference is that a smaller fraction of the energy stored in inductor La is returned to the source (when compared to the other approaches), thus reducing energy losses. The third difference is that for the other approaches, the inductor La current reaches its peak at t3. Instead, for the approach of the '750 application, the peak current through La is lower and the peak current is achieved earlier in time (at event t2), resulting in the time period from t3 to t4 being significantly shorter for the described arrangements. Additionally, the time from t2 to t4 for the described arrangements is shorter than the time from t3 to t4 for other approaches.

The operation of example arrangements of the '750 application described hereinabove results in switches Sa1, Sa2, and S1 and inductor La each conducting current for shorter amounts of time (when compared to the other approaches) with lower RMS current levels, resulting in significantly lower energy loss. The benefits that can accrue by use of the arrangements include: RMS current through Sa1, Sa2, S1, and La are lowered, since Sa1 turns off before the switch node voltage reaching Vin, resulting in lower peak current in La, Sa1, and Sa2; conduction time for switch Sa1 is reduced, since it turns off earlier than in prior approaches, turning off before the switch node voltage reaching Vin; and, since the peak current in La is lower for the arrangements described hereinabove, the current in La ramps to zero in less time, resulting in lower RMS current in switch S1. In addition, since the current in La ramps to zero more rapidly, the conduction times for switch Sa2, switch S1, and inductor La are also reduced.

Figure 7:
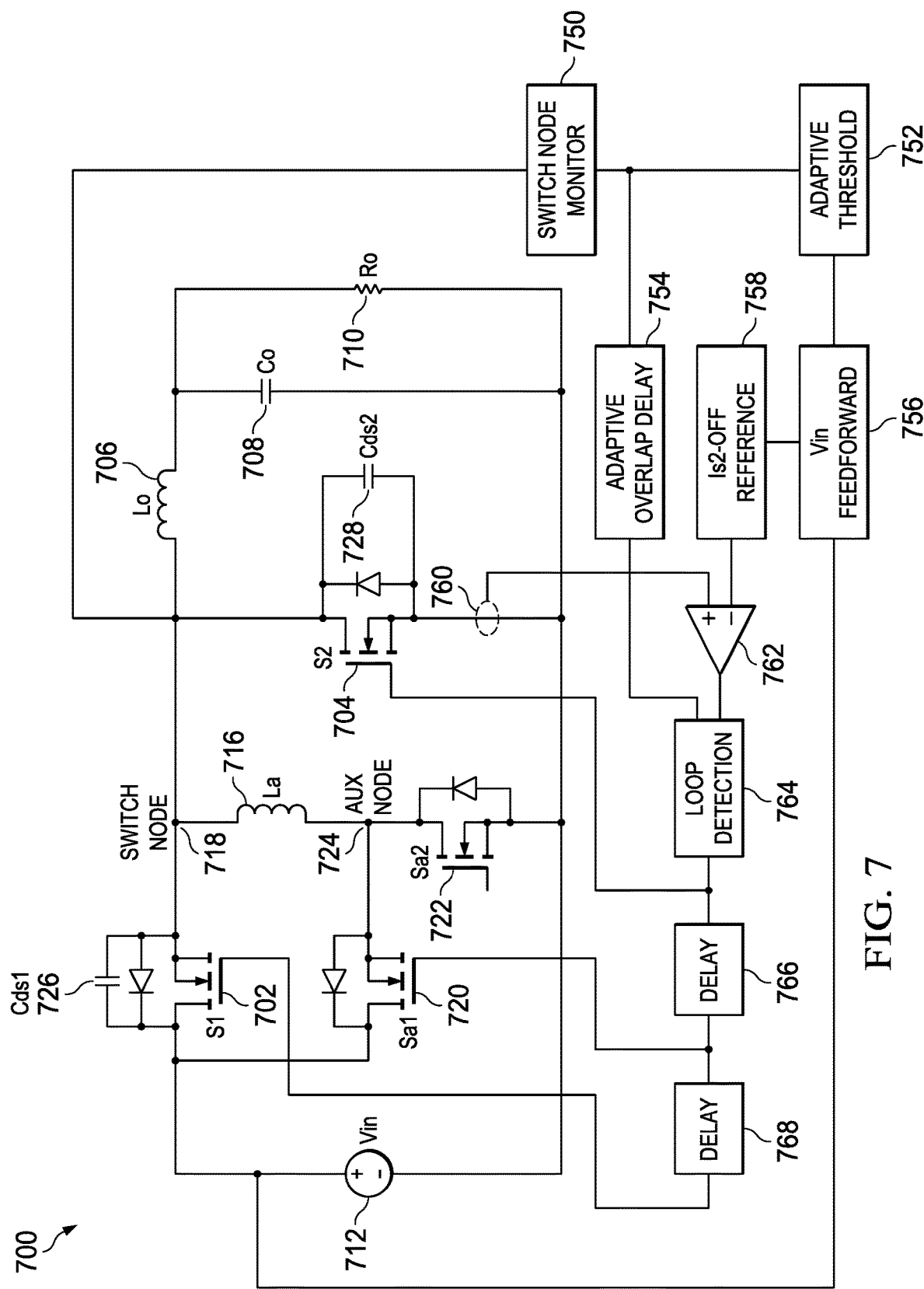
FIG. 7 is a circuit diagram of a ZVT buck converter circuit including control elements.

FIG. 7 is a diagram of a ZVT buck converter circuit 700 including control elements for controlling the operation of the switches in the ZVT buck converter to form an arrangement of the present application. Similarly labeled elements of FIG. 7 perform similar functions to those of FIG. 1. That is, elements 702, 704, 706, 708, 710, 712, 716, 718, 720, 722, 724, 726, and 728 perform similar functions to elements 102, 104, 106, 108, 110, 112, 116, 118, 120, 122, 124, 126, and 128, respectively, in FIG. 1. The timing of the operation of circuit 700 during the interval from when S2 turns off until S1 turns on is shown in FIG. 3. Elements 750 through 768 control the gates of switches S1 (702), Sa1 (720) and S2 (704) as further described hereinbelow.

Elements 750 through 768 include components that implement two feedback loops that control the timing of switches S1, S2 and Sa1. The first feedback loop includes switch node monitor 750, adaptive threshold unit 752, Vin feedforward unit 756, Is2-off reference 758, current monitor 760 and comparator 762. This feedback loop determines when to shut off switch S2 (event t1 in FIG. 3) based on the current Is2 through switch S2. The second feedback loop includes switch node monitor 750 and adaptive overlap delay unit 754. This loop determines when to shut off switch S2 based on an adaptive time delay. The second feedback loop is used when the load 710 (Ro) is drawing so little current that the first loop cannot be used to accurately set the timing of circuit 700. Loop detection unit 764 determines which of these two feedback loops sets the control timing as further explained hereinbelow.

With regard to the first feedback loop, switch node monitor 750 captures the voltage at the switch node when S1 turns on at the end of the S2-on to S1-on gap (from t1 to t3 in FIG. 3). The goal is to make the switch node voltage $V_{sw}$ at this time as close to Vin as possible. Adaptive threshold unit 752 compares Vin to the switch node voltage $V_{sw}$. If $V_{sw}$ is less than Vin, the base Is2-off reference is incremented higher. If $V_{sw}$ is greater than Vin, the base Is2-off reference is decremented lower. The new base Is2-off reference is then used for the next cycle of converter circuit 700 at the end of the S2-on to S1-on gap.

Vin feedforward unit 756 compensates for fluctuations of the input voltage Vin. Using the feedforward of the voltage Vin avoids the situation where a temporary fluctuation of Vin causes a large adjustment to the Is2-off reference. Such fluctuations can occur, for example, when a starter motor of a car pulls a large amount of current from the battery or with other temporary side loads to supply 712. When the fluctuation is over, circuit 700 must then adjust back to near the original value of Is2-off reference. The need to adjust back to the original value will cause circuit 700 to have many cycles where the Is2-off reference is not correct for proper operation of circuit 700. During this time, the switch node voltage will be significantly higher than Vin or lower than Vin. During this time, circuit 700 will operate inefficiently, requiring more robust specifications for switch S1.

Figure 8:
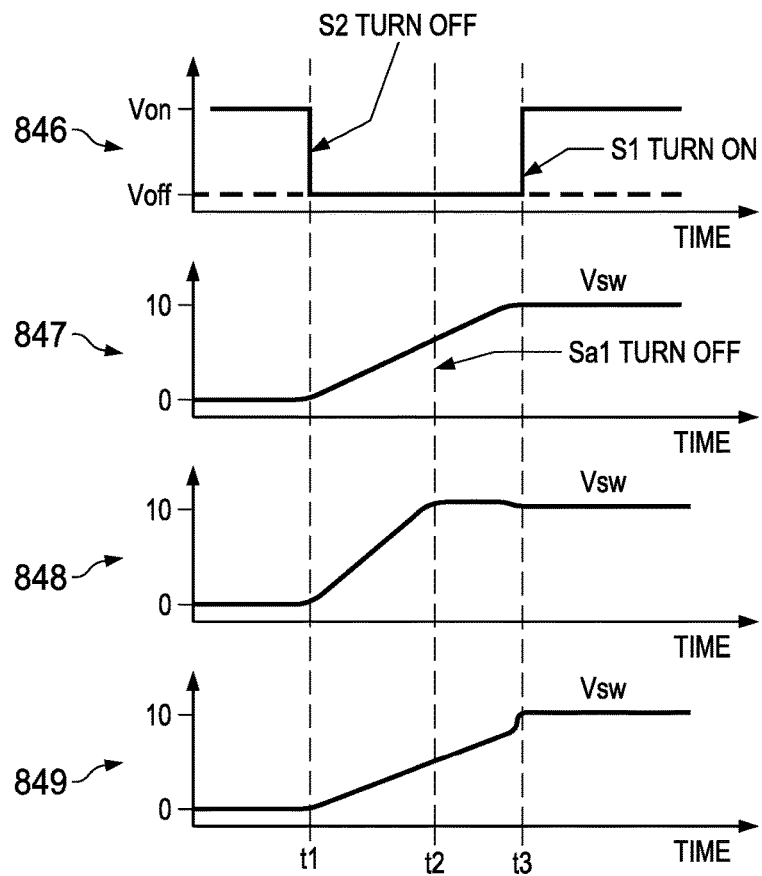
FIG. 8 is a series of graphs showing the effect on the switch node voltage under different levels of adjustment.

FIG. 8 is a series of graphs 846-849 showing the effect on the switch node voltage $V_{sw}$ under different levels of adjustment. Only the events at times t1, t2 and t3 (FIG. 3) are shown for clarity. In these graphs, it is assumed that Vin is 10V and thus the goal for $V_{sw}$ at t3 is 10V. Graph 846 shows when S2 turns off and when S1 turns on. Graph 847 shows an ideal case for voltage $V_{sw}$ where $V_{sw}$ reaches 10V at t3. In graph 848, $V_{sw}$ reaches 10V too soon, thus wasting energy as $V_{sw}$ overshoots the target voltage of 10V. The graph 848 only shows a mild over voltage at t3 because the voltage is clamped by the body diode of S1. However, when the switch node voltage reaches Vin before t2, this causes excess voltage stress on S2. In graph 849, switch S2 is turned off too soon. Thus, the ZVT circuitry does not have time to reach the desired level of $V_{sw}$. This adds to power loss because of the current surge through S1 that is due to the difference of $V_{in}$ and $V_{sw}$.

Figure 9:
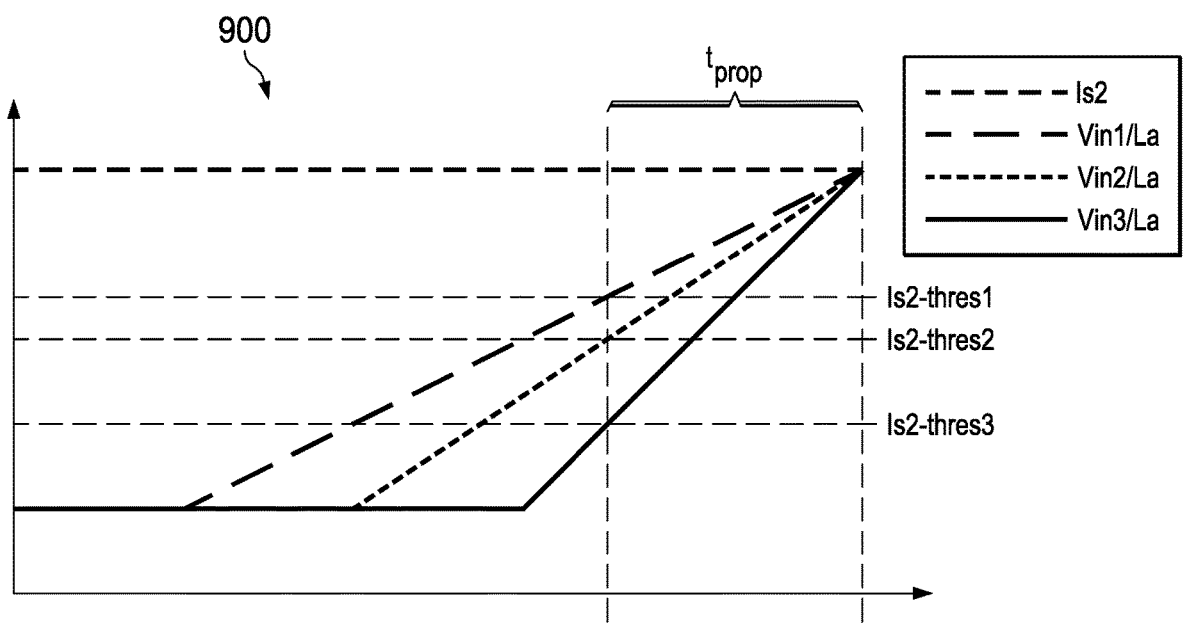
FIG. 9 is a graph showing the effect of input voltage on the ZVT process.

As noted hereinabove, the Vin feedforward unit 756 (FIG. 7) compensates for fluctuations of Vin. FIG. 9 is a graph 900 showing the effect of Vin on the ZVT process. When switch Sa1 (720 in FIG. 7) turns on at t0 (FIG. 3), the current through inductor La (716 FIG. 7) begins rising on a slope that is proportional to Vin. In FIG. 9, $t_{prop}$ represents a propagation delay including the combined delays of the current comparator and S2 driver turn-off. The beginning of $t_{prop}$ is when the current comparator needs to trip. The end of $t_{prop}$ is when the current in S2 is equal to IS2-off. Vin3>Vin2>Vin1 in FIG. 9. Therefore, Vin3/La has a greater slope than Vin2/La, and Vin2/La has a greater slope than Vin1/La. At this point the resonant effect discussed above will continue the rise of the current through inductance La to reach the goal current of Is2 shown in FIG. 9, which will place the voltage at the switch node (718 in FIG. 7) at the desired voltage.

The shut off of switch S2 is determined by a comparison of the current through S2 and the Is2-thres reference. Sa1 is shut off ⅙ tr after S2 is shut off. The proper current Is2-thres for each value of Vin is shown in FIG. 9, where the slope of each line crosses the beginning of $t_{prop}$ (i.e. at t2). These current values are labeled Is2-thres1, Is2-thres2 and Is2-thres3, which correspond to the voltages Vin1, Vin2 and Vin3, respectively. As shown by FIG. 9, the proper value of Is2-thres changes with the level of Vin. The correction can be determined mathematically using the formula in Equation 1:

$$|i_{s2off}| = |i_{s2\_thres}| - \frac{V_{in}}{La}t_{prop} \qquad [1]$$

Where $t_{prop}$ is a propagation delay including the combined delays of the current comparator and S2 driver turn-off. This adjustment is performed by Vin feedforward unit 756 and provided to Is2-off reference 758.

The second loop in the example arrangement of FIG. 7 starts with the switch node monitor 750, which monitors the voltage at switch node 718 at the time switch 702 (S1) turns on. Adaptive overlap delay unit 754 includes an overlap time from t0 to t1. That is, the time when S2 and Sa1 are both turned on (i.e. the transistor on times overlap). As further explained hereinbelow, the second feedback control loop only applies when load current through load 710 (Ro) is small, such that the first feedback control loop cannot accurately determine the time between t0 and t1. Switch node monitor 750 compares the voltage at switch node 718 ($V_{sw}$) at the point when S1 turns on to conduct the voltage Vin and adaptive overlap delay unit 754 adjusts the overlap time based on the output of switch node monitor 750. If $V_{sw}$ is less than Vin, the overlap time is increased. If $V_{sw}$ is more than Vin, the overlap time is decreased. Adaptive overlay delay unit then compares the overlap time to a clocked time after t0. A comparator compares the time after t0 to the overlap delay, as is further explained with regard to FIG. 10 hereinbelow.

Figure 10:
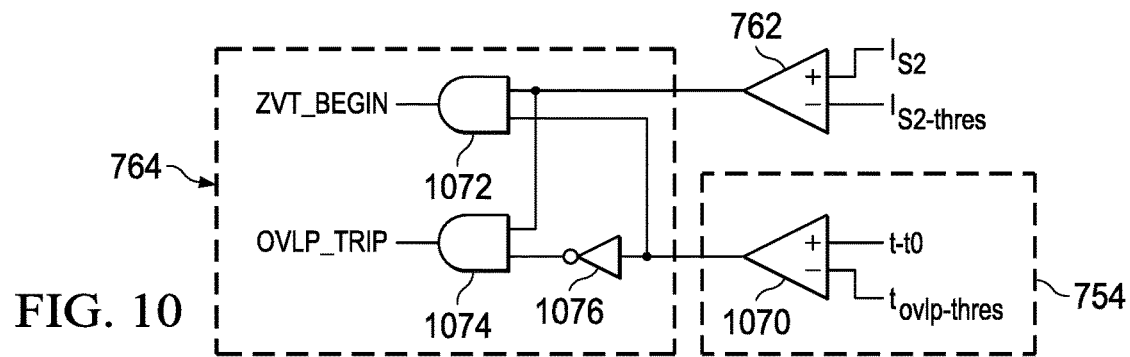
FIG. 10 is a circuit diagram of the loop detection unit.

As noted hereinabove, the second feedback control loop of FIG. 7 only controls the circuit under very light loads, which means that current Is2 is very small. Loop detection unit 764 determines which loop controls. FIG. 10 is a circuit diagram of an example implementation that can be used for the loop detection unit 764. Event t1 is triggered by the ZVT_BEGIN signal, which is the output of AND gate 1072. One of the inputs of AND gate 1072 is the output of comparator 762, which provides a high or "one" output when Is2 is greater (less negative) than Is2-thres. The other input to AND gate 1072 is from comparator 1070, which is part of overlap delay unit 754. Comparator 1070 provides a high or "one" output when the time after t0 (t−t0) is greater than $t_{ovlp-thres}$. Therefore, t1 is triggered when both comparators 762 and 1070 provide a high or "one" output. Under most loads, current Is2 will cross Is2-thres well after the time after t0 passes $t_{ovlp-thres}$. Thus, the time when the ZVT operation begins (when ZVT_BEGIN is high or a "one") is essentially controlled by comparator 762. However, under very light loads, Is2 current is always below (that is, less negative or smaller absolute value) than Is2-thres. When the load current is very light, very little current through inductor 716 La (FIG. 7) drives the switch node 718 (FIG. 7) to Vin. Under these very light loads, current Is2 is always higher (less negative) than Is2-thres. In this case, comparator 762 provides a "one" output before comparator 1070. Therefore, the ZVT_BEGIN signal is under the control of comparator 1070. In addition, the inputs to AND gate 1074 are the output of comparator 762 and the output of comparator 1070 as inverted by inverter 1076. The output of AND gate 1074 is the OVLP_TRIP signal. Therefore, this signal is only a "one" when the output of comparator 762 is high while the output of comparator 1070 is low, i.e., when overlap delay unit 754 and the second loop are in control. OVLP_TRIP will only be a "one" while the output of comparator 1070 is low. Accordingly, the OVLP_TRIP signal should be latched in most applications (so that it can be provided to other control functions).

Returning to FIG. 7, loop detection unit 764 provides a signal to turn off switch 704 (S2) according to the determined controlling loop (at event t1 in FIG. 3). This signal also begins the timer for delay 766. In an example arrangement, delay 766 provides a delay of ⅙ tr; that is, ⅙ of the cycle time of at the resonant frequency of the resonant circuit shown in FIG. 5. After the delay period of delay 766, switch 720 (Sa1) is turned off (event t2 in FIG. 3) and the timer for delay 768 begins. In an example arrangement, delay unit 768 provides a delay of 1/12 tr; that is, 1/12 of the cycle time of at the resonant frequency of the resonant circuit shown in FIG. 6. Not shown is a short delay from the output of delay 766 controlling the turn on of switch 722. As explained hereinabove, this dead time delay is to prevent a direct short that may occur if switch 720 (Sa1) and switch 722 (Sa2) were on at the same time. After this time period, switch 702 (S1) is turned on (at event t3) and the buck converter cycle begins again.

Figure 11:
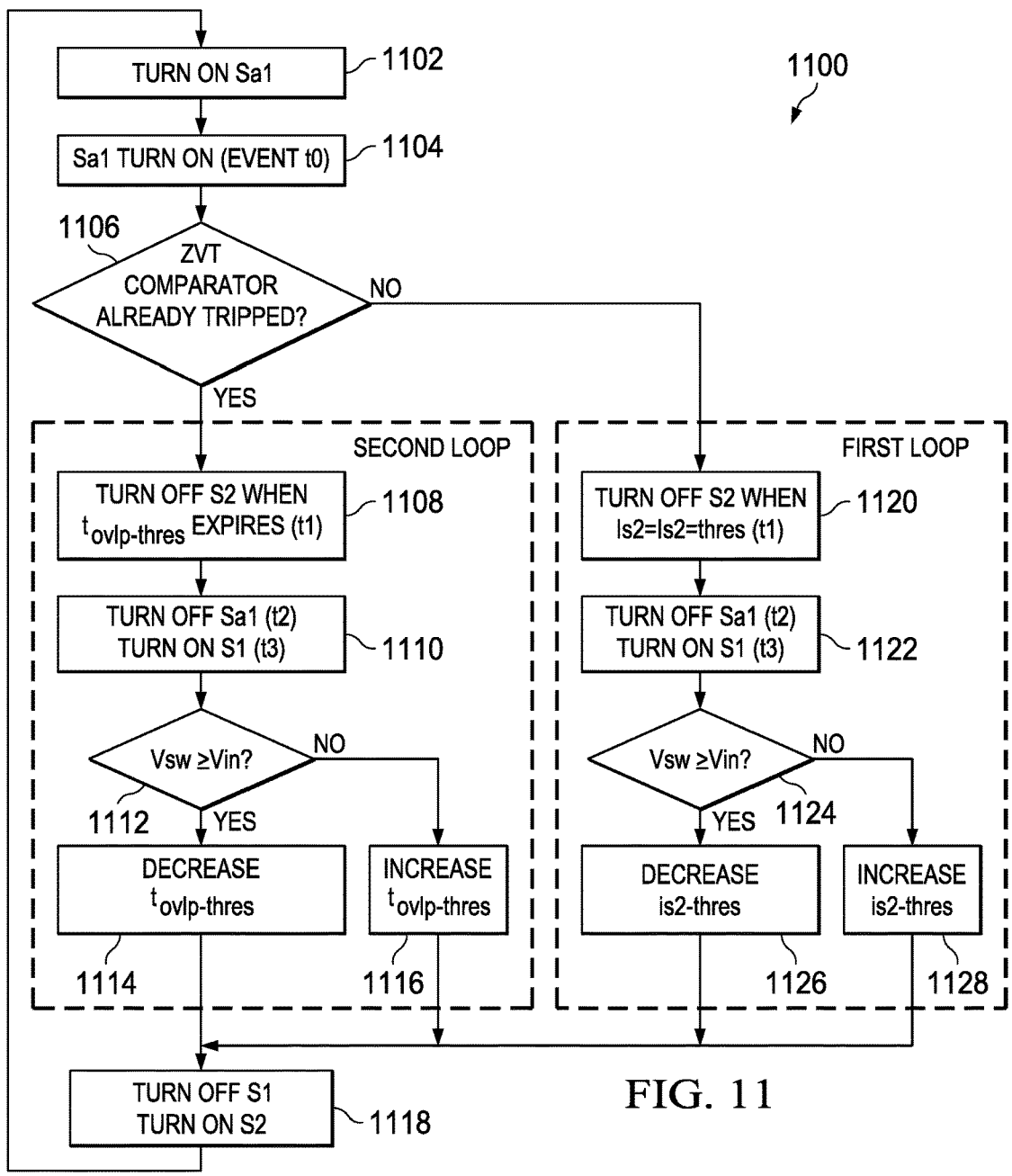
FIG. 11 is a flow chart showing the operation of the two loops of the zero voltage transition (ZVT) functionality of the circuit of FIG. 7.

FIG. 11 is a flow chart 1100 showing the operation of the two loops of the zero voltage transition (ZVT) functionality of circuit 700 (see FIG. 7). At step 1102 the ZVT process begins with turning on switch Sa1 (720 in FIG. 7). As noted in step 1104, the turn on of Sa1 is at t0 (in FIG. 3). In step 1106 loop detection unit 764 determines which loop will control, as explained hereinabove. As explained above, under very light load conditions, the measured current Is2 is immediately greater (less negative) than Is2-thres. In this case, $t_{ovlp\text{-}thres}$ determines when switch S2 (704 in FIG. 7) is turned off, as shown in step 1108. Switch Sa1 (720 in FIG. 7) is then turned off and switch S1 (702 in FIG. 7) is turned on after the respective time delays as shown in step 1110. In step 1112, the switch node voltage $V_{sw}$ is compared to Vin. If $V_{sw}$ is greater than Vin, $t_{ovlp\text{-}thres}$ is decremented for the next cycle, as shown in step 1114. If $V_{sw}$ is less than Vin, $t_{ovlp\text{-}thres}$ is incremented for the next cycle, as shown in step 1116. In step 1118, switch S1 is turned off and switch S2 is turned on, in accordance with the duty cycle of circuit 700 (FIG. 7). The method in the flow diagram in FIG. 11 then returns to step 1102.

As explained hereinabove, when load conditions are not light, the measured current Is2 will become greater than Is2_thres after $t_{ovlp\text{-}thres}$. In this case, in step 1106, the comparison of the current Is2 to Is2-thres made by comparator 762 (in FIG. 7) determines when switch S2 (704 in FIG. 7) is turned off, as shown in step 1120. Switch Sa1 (720 in FIG. 7) is then turned off and switch S1 (702 in FIG. 7) is turned on after the respective time delays as shown in step 1122. In step 1124, the switch node voltage $V_{sw}$ is compared to Vin. If $V_{sw}$ is greater than Vin, Is2_thres is decremented for the next cycle, as shown in step 1126. If $V_{sw}$ is less than Vin, Is2_thres is incremented for the next cycle, as shown in step 1128. Then, in step 1118, switch S1 is turned off and switch S2 is turned on, in accordance with the duty cycle of circuit 700 (FIG. 7). The method in the flow diagram then returns to step 1102.

FIG. 11 only illustrates aspects of switch sequencing and timing control for the ZVT part of the power converter cycle, and does not illustrate the sequencing and timing control for the entire ZVT function or for the remaining operations of the power converter.

Figure 12:
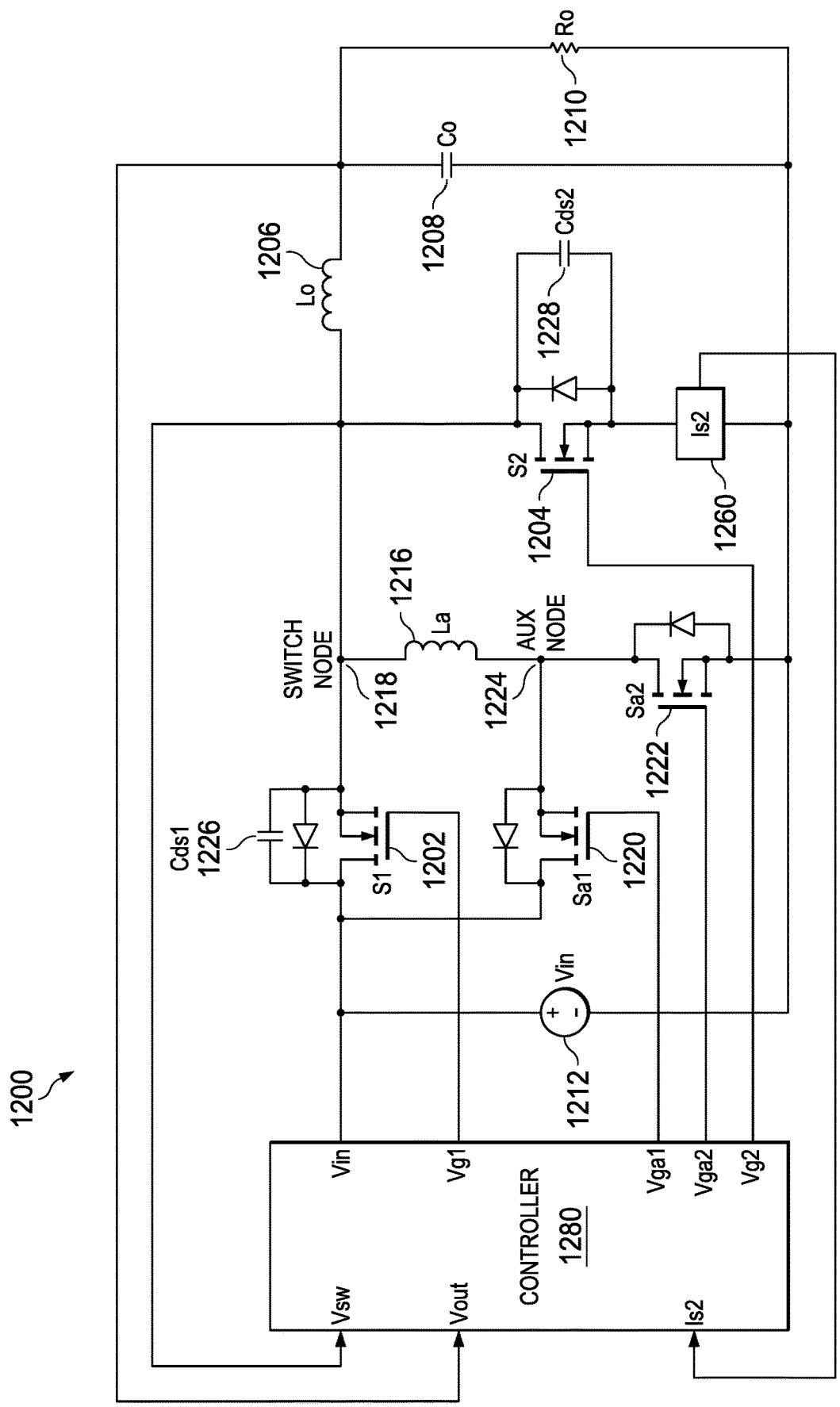
FIG. 12 is a circuit diagram including a controller that provides a ZVT power converter in a buck circuit topology that incorporates the arrangements of the present application.

FIG. 12 depicts in another block diagram of a circuit 1200 including a controller 1280 that provides a ZVT power converter in a buck circuit topology incorporating arrangements of the present application. In an aspect, controller 1280 can be formed as a monolithic integrated circuit or a multichip package, which may or may not include other components shown in FIG. 12. Similarly labeled elements of FIG. 12 perform similar functions to those of FIG. 7. That is, elements 1202, 1204, 1206, 1208, 1210, 1212, 1216, 1218, 1220, 1222, 1224, 1226, and 1228 perform similar functions to elements 702, 704, 706, 708, 710, 712, 716, 718, 720, 722, 724, 726, and 728, respectively, in FIG. 7. In circuit 1200, the example buck converter of FIG. 1 is again shown, with an input voltage Vin, a pair of primary switches S1, S2, which with the output inductor Lo, capacitor Co, and resistance Ro, provide a voltage Vout to a load Ro coupled to the output. To provide the zero voltage transition function for the converter, auxiliary switches Sa1 and Sa2, and inductor La, are used to control the voltage at the source terminal of switch S1 and to allow switch S1 to be turned on when the source-drain voltage is approximately zero.

In FIG. 12, a controller 1280 provides the gate control voltages Vg1, Vg2 to the primary switches S1, S2 and also the gate control voltages Vga1, Vga2, to the auxiliary switches Sa1, Sa2. Controller 1280 implements the switching sequences to operate the buck converter of circuit 1200 including the delayed turn off of the auxiliary switch Sa1, and the delayed turn on of switch S1 after that event, switching sequences that are used in the arrangements of the present application to improve the performance of the ZVT converter. Controller 1280 also controls the gate voltages for other portions of the converter operating cycle to regulate the output voltage. The inputs to controller 1280 include the input voltage, Vin, the output voltage, Vout, the switch node voltage, $V_{sw}$ and the current Is2 (or a voltage equivalent) provided by current monitor 1260. Among other functions, controller 1280 performs the functions of elements 750, 752, 754, 756, 758, 762, 764, 766 and 768 of FIG. 7 described hereinabove.

Controller 1280 can be implemented in a variety of ways, for example as circuits including, as non-limiting examples, a microcontroller, microprocessor, CPU, DSP, or other programmable logic, as a dedicated logic function such as a state machine, and can include fixed or user programmable instructions. Further, as an alternative arrangement, controller 1280 can be implemented on a separate integrated circuit, with the switches S1, S2, Sa1, Sa2, and the remaining passive analog components, implemented on a stand-alone integrated circuit. In an alternative, one or more of switches S1, S2, Sa1, Sa2, and the remaining passive analog components may be implemented in the same substrate as controller 1280. Controller 1280 can be implemented as an application specific integrated circuit (ASIC), using field programmable gate arrays (FPGAs) or complex programmable logic devices (CPLDs) and the like. The sequencing and timing control of the novel arrangements can be implemented as software, firmware or hardcoded instructions. Delay lines and counters and the like can be used to determine the delays ⅙ tr, 1/12 tr, as determined by a particular hardware designer. Because the arrangements herein are implemented as changes in the sequence of gate signals applied to the transistors of a converter, the arrangements can be utilized in existing converter circuits by the modification of software and some sensing hardware, and thus the arrangements can be used to improve the performance of prior existing systems without the need for entire replacements of the converter hardware.

In an example aspect, an integrated circuit includes a third switch control output; a second switch control output; a first switch control output; a fourth switch control output; and a switch node voltage input. Timing circuitry causes a first closed signal on the first switch control output before a signal on the second switch control output changes from a second closed signal to a first open signal. The timing circuitry causes the first switch control output to provide a second open signal after a first selected time after second switch control output changes from the second closed signal to the first open signal. The timing circuitry causes the third switch control output to provide a third closed signal a second selected time after the first switch control signal changes from the first closed signal to a third open signal. The timing circuitry determine timing from a beginning of the first closed signal on the first switch control output to the beginning of the first open signal on the second switch control output based on a later of an overlap time and a current through a switch connected to the second switch control output exceeding a threshold current.

In another example aspect, the integrated circuit adjusts the overlap time based on a comparison of the of a supply voltage level at one current handling terminal of a first switch connected to the third switch control output and a measured voltage at a second current handling terminal of the switch before the third closed signal.

In another example aspect, the integrated circuit adjusts the threshold current based on a comparison of the of a supply voltage level at one current handling terminal of a first switch connected to the third switch control output and a measured voltage at a second current handling terminal of the switch before the third closed signal.

In yet another example aspect, the timing circuit causes a fourth closed signal on the fourth switch control output a third selected time after the second open signal.

In another example aspect, the second and third selected times are based on a resonant cycle time of a resonant circuit including an auxiliary inductance, an inherent capacitance of a first switch connected to the third switch control output and an inherent capacitance of a second switch connected to the second switch control output port.

In yet another example aspect, the integrated circuit controls a buck converter.

In another example aspect, at least one switch controlled by one of the first, second, third and fourth switch control output ports is formed in a same substrate as the integrated circuit.

In another example aspect, a switch coupled to at least one of the third switch control output port, second switch control output port, first switch control output port, and fourth switch control output port is a field effect transistor.

In another example aspect, an integrated circuit includes a third switch control output; a second switch control output; a first switch control output; a fourth switch control output; and a switch node voltage input. Timing circuitry causes a first closed signal on the first switch control output before a signal on the second switch control output changes from a second closed signal to a first open signal. The timing circuitry causes the first switch control output to provide a second open signal after a first selected time after second switch control output changes from the second closed signal to the first open signal. The timing circuitry causes third switch control output to provide a third closed signal a second selected time after the first switch control signal changes from the first closed signal to a third open signal. The timing circuitry determines timing from a beginning of the first closed signal on the first switch control output to the beginning of the first open signal on the second switch control output based on a current through a switch connected to the second switch control output exceeding a threshold current, in which the threshold current is adjusted as a function of a voltage level of a voltage supply.

In another example aspect, the voltage supply has one terminal coupled to a first current handling terminal of a switch controlled by the third switch control output and the voltage supply has a second terminal coupled to a second current handling terminal of a switch controlled by the second switch control output port.

In yet another example aspect, the timing circuitry determines the timing from a beginning of the first closed signal on the first switch control output to the beginning of the first open signal on the second switch control output based on a later of an overlap time and the current through the switch connected to the second switch control output exceeding the threshold current.

In another example aspect, the timing circuit causes a fourth closed signal on the fourth switch control output a third selected time after the second open signal.

In yet another example aspect, the first, second and third selected times are based on a resonant cycle time of a resonant circuit including an auxiliary inductance and an inherent capacitance of a first switch connected to the third switch control output and an inherent capacitance of a second switch connected to the second switch control output port.

In another example aspect, the integrated circuit controls a buck converter.

In another example aspect, at least one switch controlled by one of the first, second, third and fourth switch control output ports is formed in a same substrate as the integrated circuit.

In yet another example aspect, a switch coupled to at least one of the third switch control output port, second switch control output port, first switch control output port, and fourth switch control output is a field effect transistor.

In another example aspect, a method of controlling a power converter includes executing a plurality of cycles. Each cycle includes turning on a first switch during a first period, the first switch having a first current handling terminal coupled to a first terminal of a power supply and a second current handling terminal coupled to a terminal of a first inductor, the first inductor having another terminal coupled to a first terminal of an output load. Each cycle also includes turning on a second switch during a second period, the second period occurring after the first period such that the first switch and second switch are not on simultaneously, the second switch having a first current handling terminal coupled to the second current handling terminal of the first switch and a second current handling terminal coupled to a second terminal of the power supply and a second terminal of the output load. Each cycle also includes turning on a third switch at a first time during the second period and turning the third switch off at a second time after the second period but before a beginning of the first period of a succeeding cycle, a first current handling terminal of the third switch coupled to the first terminal of the power supply and a second current handling terminal coupled to a first terminal of a second inductor, a second terminal of the second inductor coupled to the second current handling terminal of the first switch. Each cycle also includes turning on a fourth switch on at a third time after the second time and turning the fourth switch on during the first period of the succeeding cycle, the fourth switch having a first current handling terminal coupled to the first terminal of the second inductor and a second current handling terminal connected to the second terminal of the power supply. The second period ends at a third time period after the first time based on a later of an overlap time and a current through a switch connected to the second switch current handling terminal exceeding a threshold current.

In another example aspect, the threshold current is adjusted in response to changes in a voltage provided by the power supply.

In another example aspect, the overlap time is adjusted based on a comparison of a voltage at a beginning of the first period on the second current handling terminal of the first switch is to a voltage provided by the power supply.

In yet another example aspect, the threshold current is adjusted based on a comparison of a voltage at a beginning of the first period on the second current handling terminal of the first switch is to a voltage provided by the power supply.

What is claimed is:

1. An integrated circuit comprising:
    timing circuitry having first, second and third outputs, the timing circuitry configured to provide: a first closed signal at the first output before the second output changes from a second closed signal to a first open signal; a second open signal at the first output a first time after the second output changes from the second closed signal to the first open signal; and a third closed signal at the third output a second time after the first output changes from the first closed signal to the second open signal;
    in which the timing circuitry is adapted to be coupled through the second output to a first switch, and the timing circuitry is configured to adjust timing from a beginning of the first closed signal to a beginning of the first open signal based on a later of: a current through the first switch exceeding a threshold current; and a clocked time after the beginning of the first closed signal; and
    in which the timing circuitry is adapted to be coupled through the third output to a second switch having first and second current terminals, and the timing circuitry is configured to adjust the clocked time based on a first voltage at the first current terminal and a second voltage at the second current terminal before the third closed signal.

2. The integrated circuit of claim 1, wherein the timing circuitry is configured to adjust the threshold current based on the first and second voltages.

3. The integrated circuit of claim 1, wherein the timing circuitry has a fourth output and is configured to provide a fourth close signal at the fourth output a third time after the first output changes from the first closed signal to the second open signal.

4. The integrated circuit of claim 1, wherein the timing circuitry is configured to adjust the first, second and third times based on: a resonant cycle time of a resonant circuit having an inductance; a capacitance of the first switch; and a capacitance of the second switch.

5. The integrated circuit of claim 1, wherein the timing circuitry is configured to control a buck converter.

6. The integrated circuit of claim 1, wherein the timing circuitry has a fourth output, and at least one of the first, second, third and fourth outputs is adapted to be coupled to a transistor in a same substrate as the integrated circuit.

7. The integrated circuit of claim 1, wherein the timing circuitry has a fourth output, and at least one of the first, second, third and fourth outputs is adapted to be coupled to a field effect transistor.

8. The integrated circuit of claim 1, wherein the timing circuitry is configured to adjust the threshold current based on the second voltage.

9. The integrated circuit of claim 8, wherein the timing circuitry has a fourth output and is adapted to be coupled through the fourth output to a third switch having a third current terminal, and the integrated circuit further comprises first and second voltage supply terminals, the first voltage supply terminal adapted to be coupled to the first current terminal, and the second voltage supply terminal adapted to be coupled to the third current terminal.

10. The integrated circuit of claim 8, wherein the timing circuitry has a fourth output and is configured to provide a fourth closed signal at the fourth output a third selected time after the first output changes from the first closed signal to the second open signal.

11. The integrated circuit of claim 8, wherein the timing circuitry is configured to adjust the first, second and third times based on: a resonant cycle time of a resonant circuit having an inductance; a capacitance of the first switch; and a capacitance of the second switch.

12. The integrated circuit of claim 8, wherein the timing circuitry is configured to control a buck converter.

13. The integrated circuit of claim 8, wherein the timing circuitry has a fourth output, and at least one of the first, second, third and fourth outputs is adapted to be coupled to a transistor in a same substrate as the integrated circuit.

14. The integrated circuit of claim 8, wherein the timing circuitry has a fourth output, and at least one of the first, second, third and fourth outputs is adapted to be coupled to a field effect transistor.

15. The integrated circuit of claim 1, wherein the timing circuitry has a fourth output and is adapted to be coupled through the fourth output to a third switch having a third current terminal, and the integrated circuit further comprises first and second voltage supply terminals, the first voltage supply terminal adapted to be coupled to the first current terminal, and the second voltage supply terminal adapted to be coupled to the third current terminal.

16. A power converter comprising:
    a first switch having a first gate;
    a second switch having a second gate and first and second current terminals; and
    timing circuitry having first, second and third outputs, the second output coupled to the first gate, the third output coupled to the second gate, and the timing circuitry configured to:
        provide a first closed signal at the first output before the second output changes from a second closed signal to a first open signal;

provide a second open signal at the first output a first time after the second output changes from the second closed signal to the first open signal;

provide a third closed signal at the third output a second time after the first output changes from the first close signal to the second open signal;

adjust timing from a beginning of the first closed signal to a beginning of the first open signal based on a later of: a current through the first switch exceeding a threshold current; and a clocked time after the beginning of the first closed signal; and adjust the clocked time based on a first voltage at the first current terminal and a second voltage at the second current terminal before the third closed signal.

17. The power converter of claim 16, wherein the timing circuitry is configured to adjust the threshold current based on the first and second voltages.

18. The power converter of claim 16, wherein the timing circuitry has a fourth output and is configured to provide a fourth closed signal at the fourth output a third time after the first output changes from the first closed signal to the second open signal.

19. The power converter of claim 16, wherein the timing circuitry is configured to adjust the first, second and third times based on: a resonant cycle time of a resonant circuit having an inductance, a capacitance of the first switch; and a capacitance of the second switch.

20. The power converter of claim 16, wherein the timing circuitry is configured to control a buck converter.

* * * * *